(12) United States Patent
Ascari et al.

(10) Patent No.: US 7,607,388 B2
(45) Date of Patent: *Oct. 27, 2009

(54) FEEDING DEVICE FOR SAFELY FEEDING FRUITS IN PARTICULAR TO PEELING-CORING MACHINES

(75) Inventors: Carlo Ascari, Cavezzo (IT); Luca Ascari, Cavezzo (IT)

(73) Assignee: A.B.L. s.r.l., Cavezzo (MO) (IT)

( * ) Notice: Subject to any disclaimer, the term of this patent is extended or adjusted under 35 U.S.C. 154(b) by 153 days.

This patent is subject to a terminal disclaimer.

(21) Appl. No.: 11/473,022

(22) Filed: Jun. 23, 2006

(65) Prior Publication Data

US 2006/0288881 A1  Dec. 28, 2006

(30) Foreign Application Priority Data

Jun. 27, 2005 (IT) .................... MO20050013 U

(51) Int. Cl.
*A23N 7/00* (2006.01)

(52) U.S. Cl. .................. 99/489; 99/491; 99/546; 99/584; 99/588; 99/589; 99/636

(58) Field of Classification Search ........... 99/539–546, 99/588–599, 584, 486–492, 600–643; 426/481–483
See application file for complete search history.

(56) References Cited

U.S. PATENT DOCUMENTS

| | | | | |
|---|---|---|---|---|
| 1,872,731 A | * | 8/1932 | Goranson et al. | 99/593 |
| 2,882,945 A | * | 4/1959 | De Back et al. | 99/546 |
| 3,058,502 A | * | 10/1962 | Loveland et al. | 99/543 |
| 3,067,791 A | * | 12/1962 | Boyce | 99/593 |
| 3,132,750 A | * | 5/1964 | Grotewold | 414/744.2 |
| 3,680,614 A | * | 8/1972 | Polk, Jr. | 99/589 |
| 4,176,594 A | * | 12/1979 | Amstad | 99/593 |
| 4,318,339 A | * | 3/1982 | Sage | 99/589 |
| 4,430,932 A | * | 2/1984 | Tichy et al. | 99/593 |
| 4,787,305 A | * | 11/1988 | Akesson | 99/538 |
| 6,796,224 B2 | * | 9/2004 | Ascari et al. | 99/489 |
| 6,966,254 B2 | * | 11/2005 | Ascari et al. | 99/489 |

* cited by examiner

*Primary Examiner*—Timothy F. Simone
(74) *Attorney, Agent, or Firm*—Young & Thompson

(57) ABSTRACT

The invention relates to a fruit feeding device, or fruit conveyor, for fruits like melons and pine-apples, which is used to supply peeling machines, coring machines, and peeling-coring machines with such fruits; the feeding device allows to work safely since it prevents the operator's hands from coming near the moving members, though the fruits are manually loaded on the fruit conveyor.

In particular, it is suitable in those cases where the fruits have to be manually loaded because their automatic orientation is difficult and expensive to perform.

13 Claims, 4 Drawing Sheets

FEEDING DEVICE FOR SAFELY FEEDING FRUITS IN PARTICULAR TO PEELING-CORING MACHINES

TECHNICAL FIELD

The present invention relates to a device allowing to feed fruits in perfect synchronism with respect to the mechanisms and the working rate of coring and peeling machines, and preventing the operator's hands from approaching moving members such as pliers or other means used to seize the fruits.

BACKGROUND ART

According to the present state of the art there are machines which process only melons and machines used to process only pine-apples; moreover, there are machines used to peel fruits from outside and recently machines have been developed which are capable to peel them from inside and to process both melons and pine-apples, provided these machines are adequately adapted for this task, as described in the Italian utility model application MO2004U000017 filed in Modena on Jul. 28, 2004, in the name of A.B.L. s.r.l. in Cavezzo (Modena), having the title: "Perfezionamenti alle machine pelatrici e detorsolatrici per meloni e ananas" ("Improvements to peeling and coring machines for melons and pine-apples"). In all these machines the fruits are first manually fed by putting them, with an appropriate orientation, onto a support (cup) or "cradle", where they are seized by pliers or other means in order to process them.

With such working conditions there is a risk that the operator's hands may touch moving members, thereby causing an accident or an injury which may be more or less serious.

An object of the present invention is to provide machine manufacturers with an injury preventing device that avoids any contact of the operator's hands with the moving members of the machine.

A further object is to accelerate the working (that is, processing) rate, or efficiency, by letting the feeding device move in synchronism with the mechanisms of the machine.

Still another object is to adapt the device—by using known means—for permitting its application on any kind of already known peeling-coring machine for melons and pine-apples.

Still another object is to provide an embodiment according to which the device may be incorporated in the machine itself, that is, it may be interconnected with the other mechanisms which form the machine.

A last, but no less important object, is to insure safety during the processing, even if the fruits are deposited manually, thereby avoiding the use of expensive devices capable of automatically orienting the fruits.

DISCLOSURE OF THE INVENTION

These and other objects are attained by a feeding device, or conveyor, according to the present invention, which is characterised in that it comprises: a powered chain conveyor driven intermittently and in synchronism with the internal, fruit grasping mechanisms present in the peeling-coring machines; a plurality of cups or other means suited to support the fruits and maintain their orientation, said cups being integrally connected to the chain conveyor by means of height-adjustable supports; a main housing or protective frame which covers on all sides and along almost the whole fruit path, both the chain conveyor and the fruit supporting cups, said main housing being located outside the peeling-coring machine; a second housing or protective frame, covering the final, upper part of the chain conveyor, and leaving uncovered only the plate of the cup on which said fruit is deposited; proximity sensors and/or detectors, controlling the stepwise advancement of the chain conveyor each time a fruit is seized and taken away; a structure for supporting all components of the feeding device, which is fixed to the structure of the peeling-coring machine in an appropriate position; a covering frame, for covering the fruits which are fed and for preventing the operator's hands from touching said internal mechanisms of the peeling-coring machine; wherein, each fruit is displaced, and provided at the required instant, within the peeling-coring machine, at the position where said internal mechanisms grasp the fruit in order to process it; and wherein said fruits have been deposited manually on the cups of the feeding device, outside the peeling-coring machine, and with a correct orientation.

BRIEF DESCRIPTION OF DRAWINGS

Further features and advantages of the invention will more clearly result from the description of an embodiment of the device as applied to the peeling-coring machine disclosed in the abovementioned utility model application MO2004U000017, said embodiment being shown for illustrative and non-limitative purposes in the annexed drawings, wherein.

BEST MODES OF CARRYING OUT THE INVENTION

In the figures, the various components of the feeding device, though covered by housings or protective side frames forming the support structure of the feeding device, have been indicated by broken lines in some cases, and in others by continuous lines, in order to render them better distinguishable.

In the various figures, the same alpha-numeric reference signs indicate the same parts or elements.

Referring to the various figures, numeral 1 denotes the chamfered blades of the peeling-coring machine which divide the fruits in two parts. Numeral 2 indicates the structure defining the contour and size of the peeling-coring machine; numeral 3 generally denotes the feeding device according to the present invention, attached in a suitable position to the structure of the peeling-coring machine 2, so that a fruit 4 can be provided at (supplied to) a position indicated by 4/*c*, where the mechanism of the peeling-coring machine can take and process it at a later time. 4/*a*-4/*b*-4/*c* indicate three successive positions occupied by a fruit to be processed.

Figure 4:
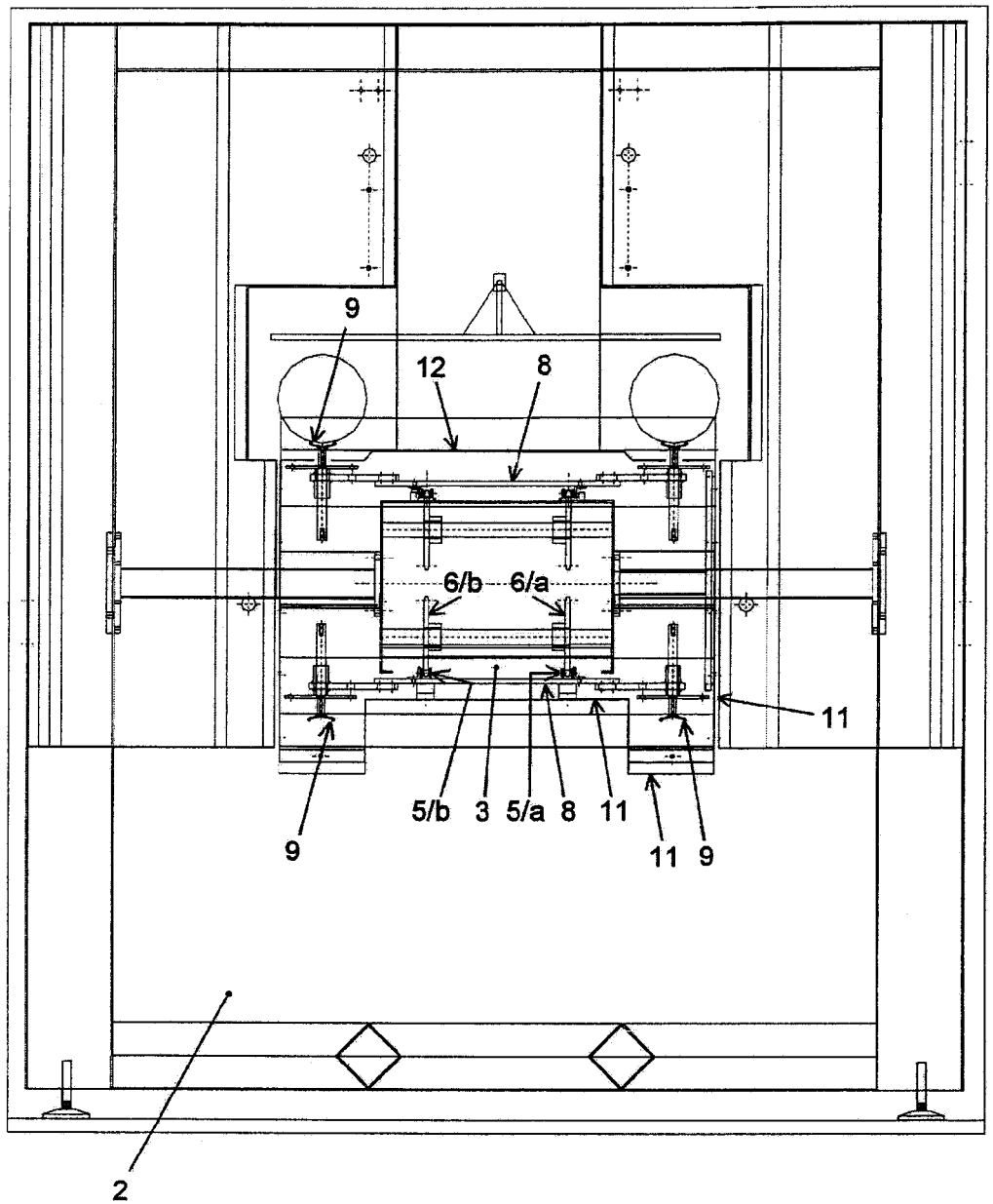
FIG. 4 shows the feeding device, observed in the direction of the arrow F2 of FIG. 2.

The device to be illustrated and described herein is adapted to feed two processing lines; it includes at least two chain conveyors 5/*a*-5/*b* associated with two respective series of gearwheels 6/*a*-6/*b* that are integrally connected to respective shafts, one of which is motorised (powered) by a ratio-motor or by a motor associated with a stepless speed change gear, 7, the latter being started or stopped according to a control function depending on the needs of the peeling-coring machine. The chains 5/*a-b* are interconnected by means of crosspieces 8 (FIG. 4) arranged at suitable distances, which support—in any known manner—the cups or "cradles" 9; the latter receive the fruits 4 laid on them; moreover, the supports 10 used to interconnect the cups 9 and the crosspieces 8 are height-adjustable in order to position and align the longitudinal axis of the fruits with the rotational axis of the fruit processing tools that will subsequently process these fruits.

A protective frame or housing 11, externally connected to the structure of the peeling-coring machine, covers and protects on all sides, with the exception of the upper part where the fruits are laid on the cups, all the components of the feeding device 3 which project from the machine.

Said upper part of the feeding device is covered by a second housing or protective frame, 12, on which two longitudinal slots 13 are present for allowing the passage of the supports 10; in this manner, the cups 9 project out of the housings only on the upper part of the feeding device, thereby allowing to manually put the fruits 4 at the position 4/*a*.

Figure 3:
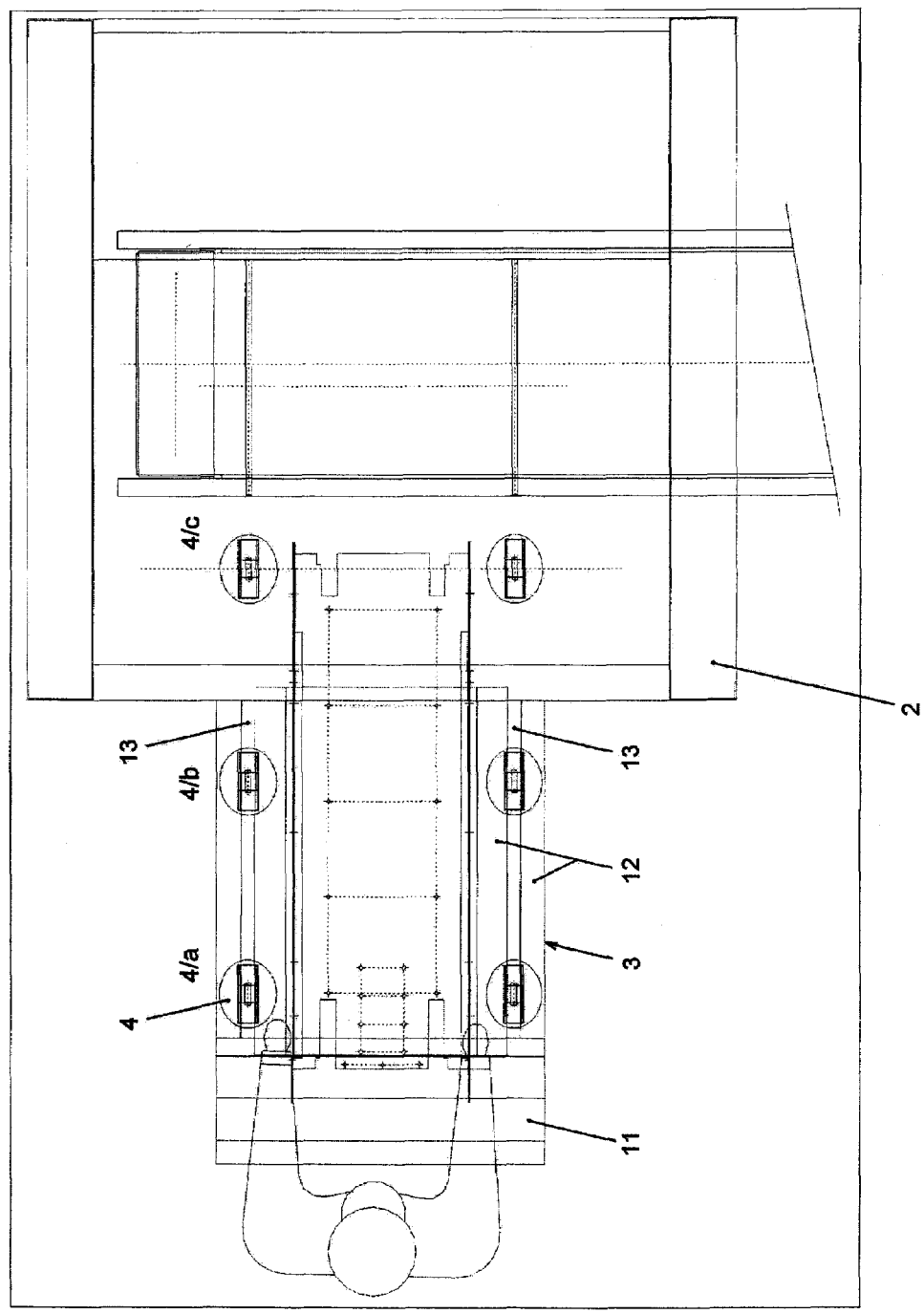
FIG. 3 is a view of the feeding device taken in the direction of the arrow F1 of FIG. 2.

A further housing or protective frame 14 (not shown in FIG. 3) is provided outside the peeling-coring machine 2, above the feeding device 3, and this housing serves to prevent an unwary person from touching with his/her hands the position 4/*c* where a fruit must be seized and taken away.

Figure 2:
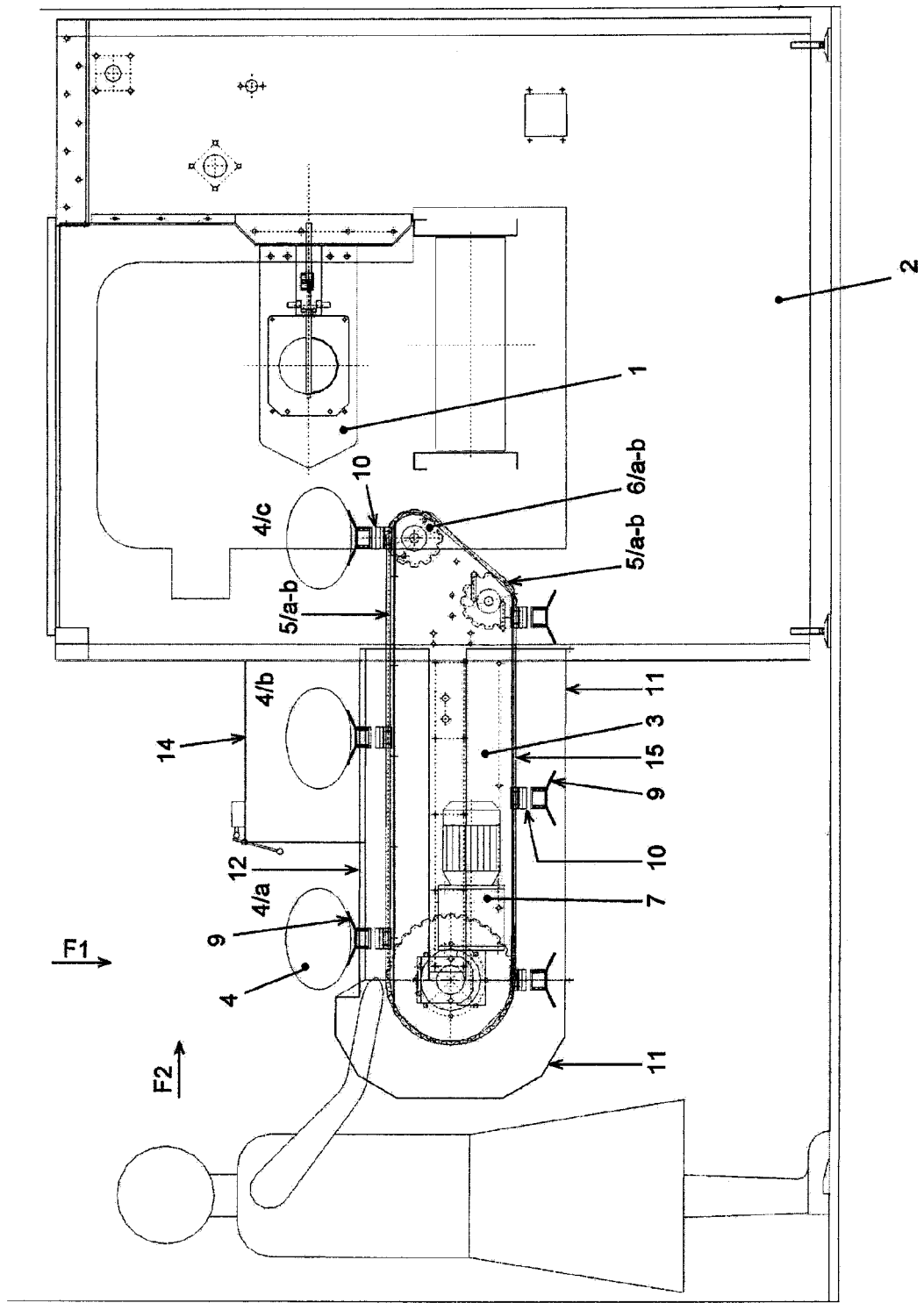
FIG. 2 schematically shows, in side view, the feeding device according to the invention, attached to the machine of FIG. 1.

The fruits 4 are put on the cups 9 only at the position 4/*a* and they are displaced towards the position 4/*c* while moving in the direction indicated by the arrow F2 of FIG. 2.

At position 4/*c*, provided a fruit 4 is present, a proximity sensor or detector, which will not be described since it is considered already known to skilled persons, will cause the feeding device 3 to remain in the stopped condition; then, when the fruit 4 is taken, the advancement of the feeding device 3 by one step is enabled, so that the next cup located at position 4/*b* is translated—together with its fruit 4—to the position 4/*c*; in this process, the chain conveyor advancement speed may be varied—for instance—by a stepless speed change gear 7, and in any case this speed must be such as to "follow" the processing rate of the peeling-coring machine to which the feeding device is attached, and at the same time it must allow the operator to deposit the fruits 4 on the cups 9.

All components of the feeding device 3 are supported by a support structure including two side frames or body sides 15 (indicated by a continuous line) used to hold the shafts on which the gearwheels are keyed (fixed); moreover, the whole device structure is configured so that it can be mounted to the structure of the peeling-coring machine in the position required for attaining the object of feeding (transferring) the fruits to the correct position, at the prescribed rate, and with the correct orientation.

It is obvious that the feeding device according to the invention may be implemented with one or more feeding lines, depending on the number of processing lines present in the peeling-coring machine to which the device must be attached.

Moreover, the device according to the invention, provided it has been adequately sized and adapted to a specific kind of fruit, may be employed/applied for/to peeling machines, coring machines, or peeling-coring machines used for other fruit types that are particularly difficult to orient automatically.

Therefore, the present invention may advantageously be applied to the processing, and in particular to the "safe feeding", of various kinds of fruits (not only melons ad pineapples), e.g. apples, pears, oranges, kiwis, etc. This is achieved by adapting the size and the shape/typology of the fruit supporting cup, to a specific fruit to be processed.

Figure 1:
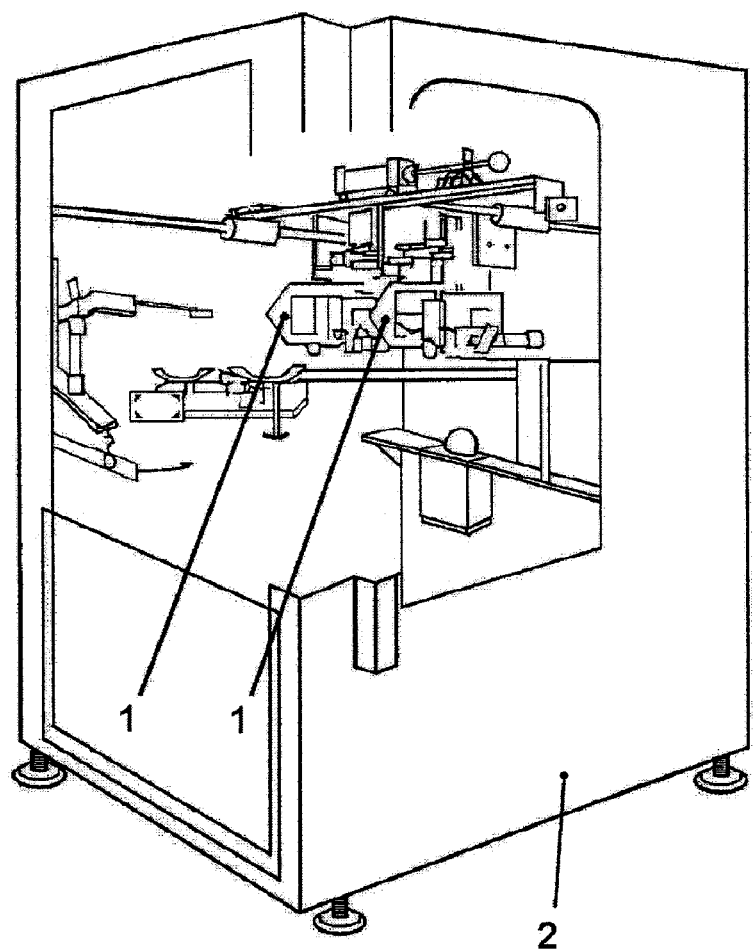
FIG. 1 does not show the feeding device according to the present invention; instead, it shows in a very schematic way the front part of the peeling-coring machine disclosed in the abovementioned application; the same figure also displays the blades used to divide in two parts the fruits to be peeled and cored.

Thus, after having manually put the fruits on the cups in an already oriented position, the processing machine will only need to take and process them. Obviously, the very processing machine which is schematically shown in FIG. 1 must be a machine suited to peel and/or core a specific type of fruit which is fed, but these problems are beyond the scope of protection concerning the present invention as such.

The cups 9 will be dimensioned according to the shape and size of the fruits to be processed and they could even be provided with means suited to facilitate the operation of orientation of the fruits and to maintain such orientation until the fruit is taken (seized) by the peeling-coring machine.

The operation of the device according to the invention is as follows.

An operator manually puts a fruit on a cup 9 in the position 4/*a* and orients this fruit accordingly;

the operator starts the feeding device 3;

the chain conveyor advances by two steps and then it stops; during this operation the operator puts a respective fruit on each cup that passes by; when a first fruit reaches the position 4/*c* the chain conveyor stops;

the operator starts the peeling-coring machine, which takes the fruit from the position 4/*c* in order to process it;

the operation of removal of the fruit from the position 4/*c* controls the chain conveyor advancement by one step;

the operator puts another fruit in the position 4/*a* and the cycle is repeated uninterruptedly until the operator stops loading the fruits and stops the advancement of the feeding device and the operation of the machine.

The materials used for the device, and the size of the same, as described above, as illustrated in the drawings, and as claimed below, may amply vary according to the requirements. Moreover, all the details could be replaced by other, technically equivalent ones, without thereby going beyond the scope of the present invention.

By adapting the shape and size of the fruit bearing cups, it becomes possible to feed even other kinds of fruits, e.g. apples, pears, oranges, kiwis, etc., by arranging the fruits with their axis horizontally or vertically, depending on how the machine to which the fruits are supplied processes these fruits.

The invention claimed is:

1. A feeding device for safely feeding fruit to a fruit handling machine, comprising:

a powered chain conveyor driven intermittently and in synchronism with internal, fruit grasping mechanisms present in the fruit handling machine;

a plurality of cups to support manually-deposited fruit and maintain a correct orientation of the deposited fruit, each cup comprising a plate upon which plate the fruit is deposited, height-adjustable supports that integrally connect said cups to the chain conveyor;

a main housing which covers, on all sides, both the chain conveyor and the fruit supporting cups, said main housing being located outside the fruit handling machine;

a second housing, covering a final, upper part of the chain conveyor, and leaving uncovered only the plate of the cup on which the fruit is deposited;

proximity sensors controlling a stepwise advancement of the chain conveyor each time a fruit is seized and taken away from one of the plates;

a supporting structure supporting the conveyor, the supporting structure being fixable to the fruit handling machine;

a covering frame positioned for covering the fruit which are fed by the conveyor and for preventing an operator's hands from touching internal mechanisms of the fruit handling machine, wherein, each cup and deposited fruit is displaced, and provided at a required instant, within the fruit handling machine, at a position where the fruit handling machine grasps the fruit in order to process the grasped fruit.

2. A feeding device according to claim 1, wherein said chain conveyor comprises a belt.

3. A feeding device according to claim 1, wherein the sensors maintain the chain conveyor in a rest condition, when the fruit is present on the cup located inside the fruit handling machine, at a position where the fruit is ready to be taken, while the sensors control advancement of the chain conveyor by one step, at the time the fruit is taken from the cup.

4. A feeding device according to claim 1, wherein said supports are height-adjustable in order to align a longitudinal axis of the fruit with an axis of rotation of tools of the fruit handling machine.

5. A feeding device according to claim 1, wherein said cups have configurations specifically adapted to receive the fruits and maintain correct fruit orientation.

6. A feeding device according to claim 1, wherein said cups comprise a configuration and size based on at least one of i) a kind, ii) a shape, and iii) a size of the fruit.

7. A feeding device according to claim 1, wherein the main housing exposes a position where the fruit are manually deposited on a first cup.

8. A feeding device according to claim 1, further comprising:

a driving system for driving the chain conveyor.

9. A feeding device according to any of the preceding claims, which may be realised with one or more feeding lines.

10. A feeding device according to claim 1, wherein fruit handling machine is peeling-coring machine for peeling and coring melons and pine-apples.

11. A feeding device according to claim 1, wherein fruit handling machine is fruit peeling-coring machine.

12. A feeding device according to claim 8, wherein, the driving system is a mechanical driving system.

13. A feeding device according to claim 8, wherein, the driving system comprises at least one a ratio-motor, a stepless speed change gear, a hydraulic system including a motor, and a hydraulic speed variator.

* * * * *

UNITED STATES PATENT AND TRADEMARK OFFICE
CERTIFICATE OF CORRECTION

PATENT NO. : 7,607,388 B2  Page 1 of 1
APPLICATION NO. : 11/473022
DATED : October 27, 2009
INVENTOR(S) : Ascari et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 279 days.

Signed and Sealed this

Twelfth Day of October, 2010

David J. Kappos
*Director of the United States Patent and Trademark Office*